Aug. 25, 1953          A. S. PARKS          2,649,771
LIQUID LEVEL CONTROL APPARATUS
Filed July 16, 1949                                   4 Sheets-Sheet 1
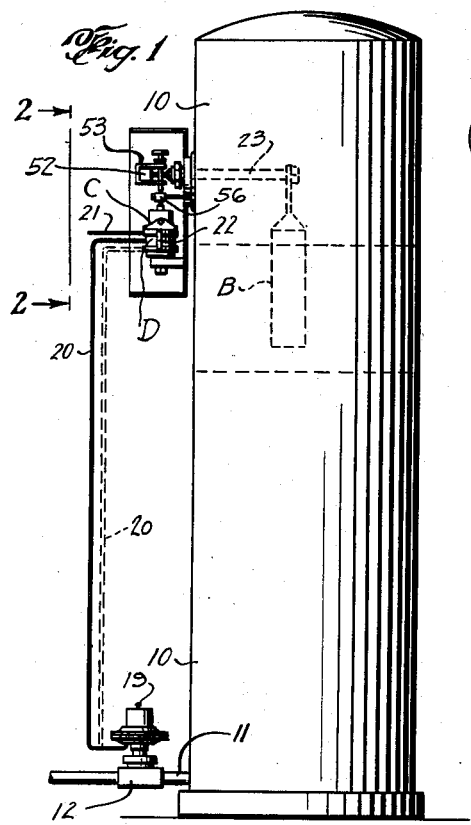
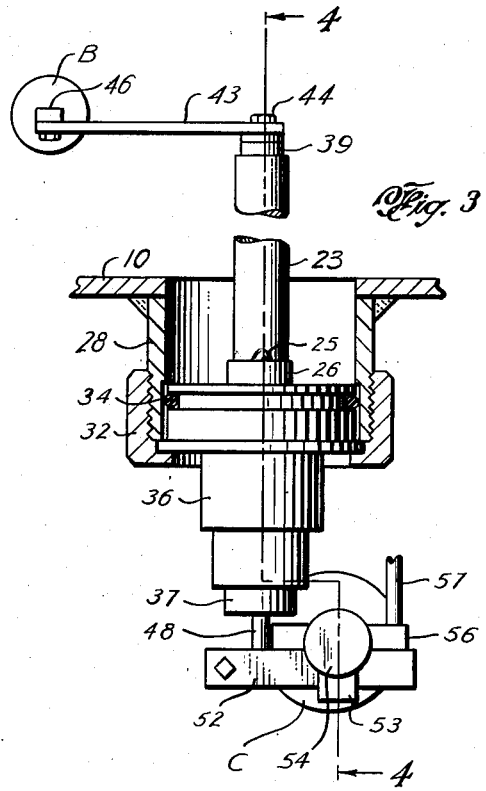
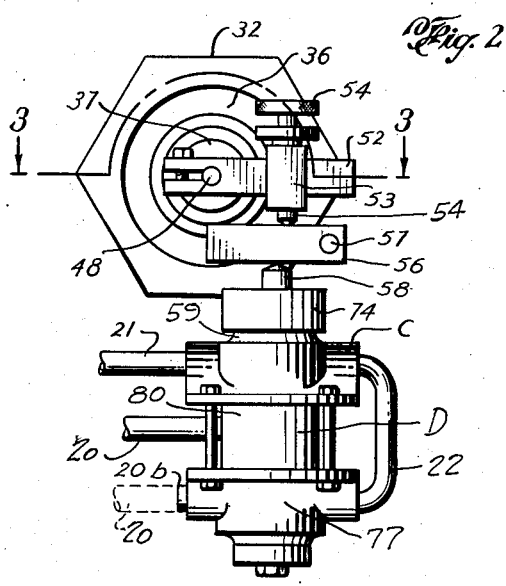
Asbury S. Parks
INVENTOR
BY
ATTORNEYS

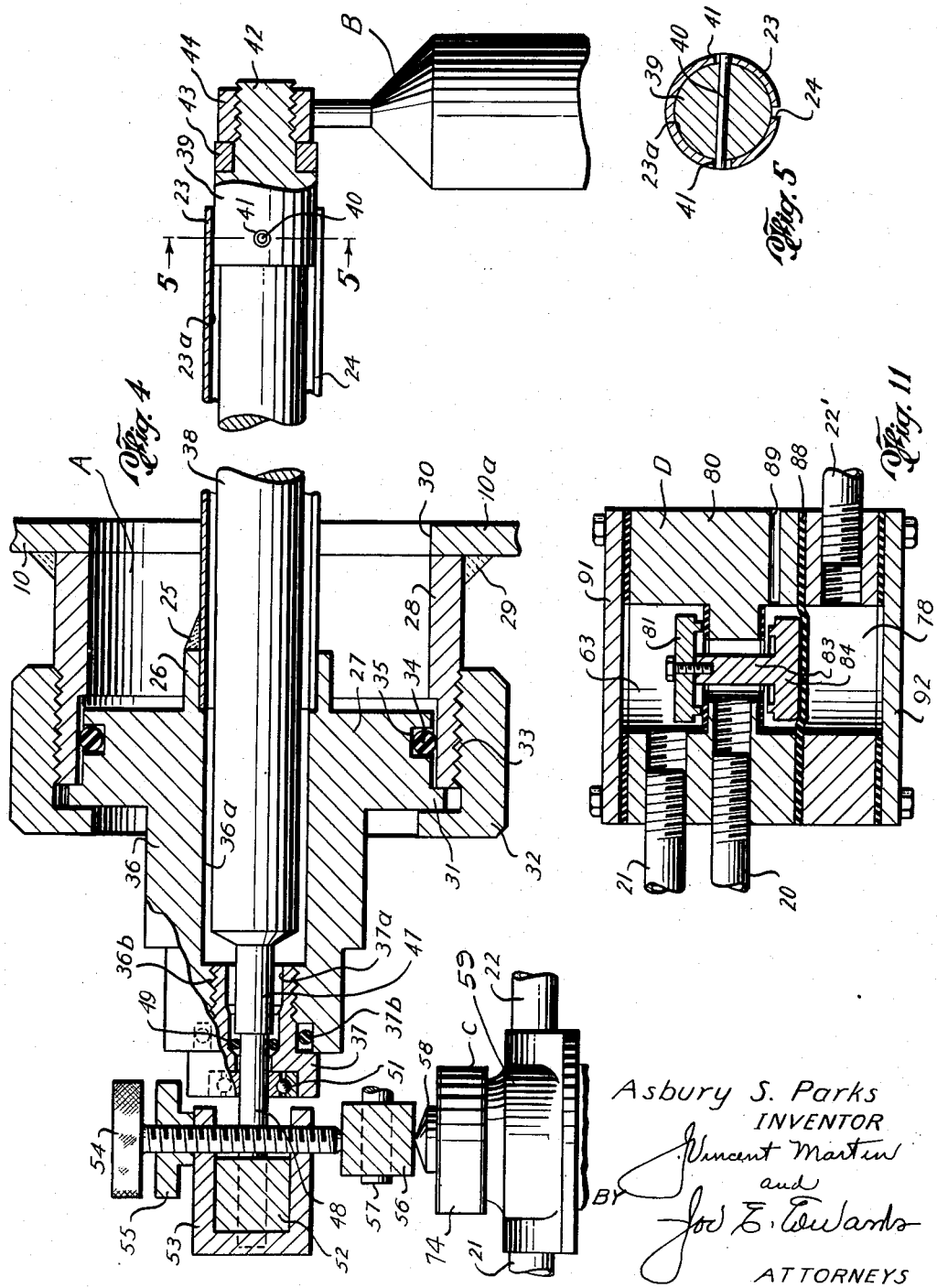

Aug. 25, 1953 A. S. PARKS 2,649,771
LIQUID LEVEL CONTROL APPARATUS
Filed July 16, 1949 4 Sheets-Sheet 3
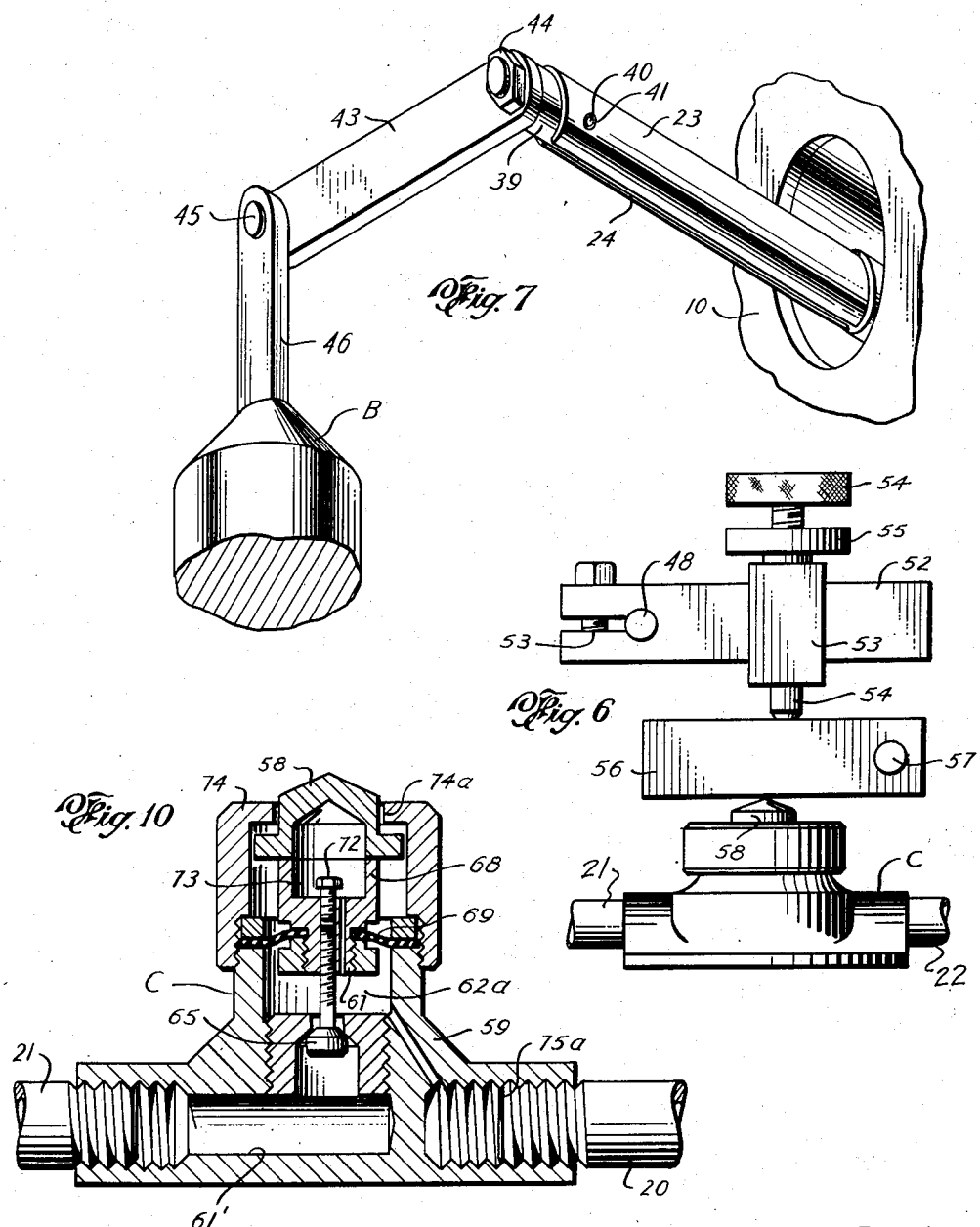
Asbury S. Parks
INVENTOR
Vincent Martin
and
Joe E. Edwards
BY
ATTORNEYS

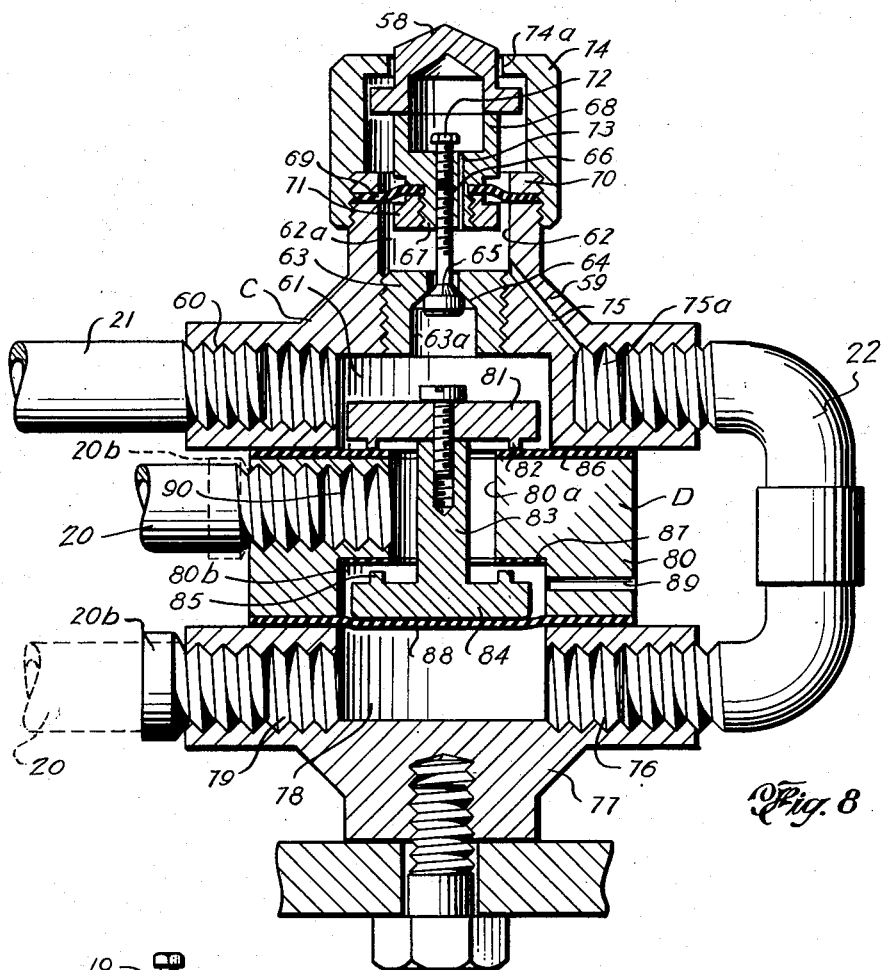
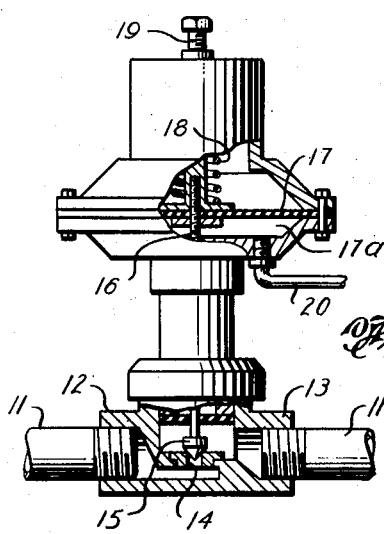

Patented Aug. 25, 1953

2,649,771

UNITED STATES PATENT OFFICE 2,649,771

LIQUID LEVEL CONTROL APPARATUS

Asbury Sloan Parks, Houston, Tex.

Application July 16, 1949, Serial No. 105,203

11 Claims. (Cl. 137—413)

This invention relates to new and useful improvements in liquid level control apparatus and relates particularly to controlling the liquid level within pressure vessels, such as oil and gas separators.

The usual type of liquid level control employs a float which is located inside of the vessel and this float has connection through a shaft or operating member which extends through the wall of the vessel with mechanism located exteriorly of the vessel for operating a liquid outlet or dump valve. With such arrangement the movement of the float due to the rise and fall of the liquid level will function to open and close the outlet or dump valve and thereby maintain a predetermined level within the vessel.

As operating pressures within the vessel increase, efficient packing off around the movable shaft or operating member of the connecting mechanism presents a problem; also, the size of the float within the vessel must be reduced to increase its strength in order to withstand the higher operating pressure without collapse. The action of the higher pressure against the packing arrangement which seals around the movable operating member causes excessive friction against said operating member and this, coupled with the fact that the size of the float must be reduced, greatly decreases the efficiency of the apparatus. It will be evident that the smaller float provides less power for operation while the higher operating pressure increases friction. Thus, it has been found that the simple type of apparatus wherein a movement of an internal float is transmitted through the wall of the vessel to an exteriorly located outlet or dump valve is not at all satisfactory under higher operating pressure conditions.

In an attempt to accurately control levels within pressure vessels, certain types of "torque tube" apparatus have been employed. In this type of apparatus the float element is actually a solid member and said float is suspended from the outer end of a tubular torque tube, which tube has its inner end fixed and permanently sealed to the wall of the vessel. The outer end of the tube which projects into the vessel is sealed closed and a float-carrying arm is attached to said outer end, whereby the float element produces a torsional stress in the tube in accordance with the liquid level. The float element has more or less buoyancy in accordance with the liquid level and changes in this buoyancy result in a change in the torque in said tube.

For transmitting the torsional movement at the end of the tube outwardly through the wall of the vessel, a solid operating rod is disposed axially within the tube and has its end attached firmly and sealed to the closed projecting end of the tube. The torsional movement of the torque tube, in accordance with changes in the buoyancy in the float element, is imparted to the solid rod so that the opposite end of said rod disposed exteriorly of the vessel will undergo a rotational movement. This arrangement requires that the torque tube be sufficiently flexible to transmit the float motion to the operating rod and to make the tube sufficiently flexible in torsion it must either be very thin walled or small in diameter or both. It is impossible to reduce the wall thickness of the tube in the higher pressure vessels because of danger of collapsing or crushing of the tube, and therefore, the result has been that the torque tubes are extremely small in diameter, relatively speaking, which makes the operating rod which extends axially within the tube also very small. Actually, this rod as commonly used is about one-eighth of an inch in diameter and is of considerable length, possibly about eighteen inches. The final result is that the float energy must be transmitted through this very small rod of considerable length which is in itself very flexible. Because of this flexibility it is impossible to apply any appreciable load to the operating end of the rod outside of the vessel and therefore, the usual type of torque tube transmitting apparatus is limited to the operation of a control mechanism that requires an absolute minimum of power.

The usual type of control employed with the present torque tube apparatus ordinarily comprises a pilot valve having a small nozzle with a flapper type valve for opening and closing said nozzle. A constant stream of pilot gas bleeds from the nozzle at all times and the movement of the flapper valve as controlled by the float position varies the back pressure on the system which feeds the nozzle, and this variation in back pressure is transmitted to a pressure-actuated liquid outlet or dump valve. A constant bleeding type of pilot is slow in operation and has the major disadvantage of requiring a constant flow of pilot gas, which constant flow causes freezing of the pilot supply regulator and in addition creates difficulty in that clogging of the very small bleed ports and openings constantly occurs. It is, therefore, apparent that the conventional torque tube apparatus is limited to controlling the operation of constant bleeding type pilot controls due primarily to the fact that sufficient energy cannot be transmitted through the apparatus to operate any mechanism which requires considerable power. Actually, the major energy or work performed by the float element is expended in twisting the torque tube or the operating rod rather than being transmitted exteriorly so that it may be utilized in operating the pilot control.

It is one object of this invention to provide an improved liquid control apparatus wherein the energy from an internal float element is efficiently transmitted to the exterior of a pressure vessel whereby a non-bleeding type of pilot control may be actuated by the position of the liquid level with respect to the float element, thereby making it possible to accurately control the exterior of a pressure vessel wherein the torque tube proper is of sufficient diameter and wall thickness to support a relatively heavy float element which will insure an ample source of energy for operating purposes and also wherein said tube is slotted longitudinally to impart torsional flexibility thereto without correspondingly reducing its bending strength, whereby said energy from the float element may be transmitted through the tube without excessive energy loss.

Another object of the invention is to provide an improved liquid level control apparatus wherein the pilot pressure control unit is constructed so that the main outlet or dump valve may be actuated either with a snap or quick-opening and quick-closing action or with a throttling action, either action being accomplished without any major change in the control unit which makes the unit readily applicable to all types of pressure vessels and to all operating conditions.

Still another object is to provide in combination with an improved torque tube assembly a pilot pressure control unit which operates on a force-balance principle, whereby a constant bleed of the pilot supply is not necessary and also whereby modulation or control of the pilot pressure in accordance with changes in the liquid level being controlled may be accomplished with substantially zero motion of the operating shaft connected with the float element.

Another object is to provide an improved unit for imparting a snap or quick-opening and quick-closing action to a liquid outlet or dump valve, which unit is extremely simple in construction whereby positive operation thereof is assured.

A particular object of the invention is to provide an improved snap control unit comprising a double-acting valve in conjunction with a pressure-responsive member, with the effective areas of the valves and pressure-responsive member being so related with respect to each other that the attainment of a predetermined control pressure will actuate the unit to place full liquid level within a pressure vessel which operates under relatively high pressure conditions.

An important object of the invention is to provide an improved liquid level control apparatus wherein the main force-transmitting or operating shaft or rod which is controlled by a float element within a pressure vessel will undergo extremely slight motion in controlling the operation of a liquid outlet or dump valve, whereby ordinary elastic pressure seal packing may be utilized to efficiently seal off around the operating shaft and whereby friction ordinarily created by the higher pressure acting against the packing will not increase frictional resistance to movement of said shaft to thereby assure maximum efficiency of the transmission of energy from the float element to the operating mechanism located exteriorly of the vessel.

Another object is to provide an improved liquid level control apparatus for pressure vessels which is extremely sensitive in operation, whereby the level of the liquid may be positively and accurately maintained at a desired predetermined level; the apparatus being readily adaptable for operating either pressure-opening or pressure-closing liquid outlets or dump valves and having a simple adjusting means which allows the liquid level in the vessel, as well as the dumping range of the outlet valve, to be accurately adjusted and controlled.

Another object of the invention is to provide an improved torque tube assembly for operating a control mechanism, which assembly is exceptionally rugged in construction and capable of withstanding high operating pressures and is also readily applicable to horizontal or vertical pressure vessels; the assembly comprising a minimum number of parts having minimum weight which facilitates mounting of the assembly without the necessity of the usual heavy flanges, special packing and the like.

A further object is to provide an improved torque tube assembly for transmitting a force from the interior to the pilot pressure on the main valve to be operated to actuate the valve in one direction and decrease of the control pressure will permit an exhaust of pilot pressure from the main valve; the device operating substantially instantaneously to impart a quick-closing action to the main valve.

Other and further objects of this invention will appear from the following description.

In the accompanying drawings which form a part of the instant specification, which are to be read in conjunction therewith, and wherein like reference numerals are used to indicate like parts in the various views:

Figure 1 is an elevation of a pressure vessel which is shown as an oil and gas separator having improved liquid level control apparatus constructed in accordance with the invention mounted thereon, Figure 2 is an enlarged elevation of the pilot control unit and its connection with the operating rod on the exterior of the vessel, Figure 3 is a horizontal, cross-sectional view taken on the line 3—3 of Figure 2, Figure 4 is a transverse vertical sectional view taken on the line 4—4 of Figure 3, Figure 5 is a sectional view taken on the line 5—5 of Figure 4, Figure 6 is an enlarged detail of the adjustment between the operating rod and the pilot unit, Figure 7 is a partial isometric view of the inner end of the torque tube and operating rod showing the connection of the float element with said rod, Figure 8 is a vertical sectional view of the combined pilot control unit and the snap control unit, Figure 9 is a view partly in section and partly in elevation of one type of outlet or dump valve which may be controlled by the apparatus, Figure 10 is a view of a modified form of the pilot control unit when said unit is used by itself without the snap control unit, and Figure 11 is a sectional view of the snap control unit when the same is constructed as a separate element, rather than in combination with the pilot unit as in Figure 8.

In the drawings, the numeral 10 designates a pressure vessel which may be an oil and gas separator and which is illustrated as having a liquid outlet pipe or line 11 in its lower portion. A liquid outlet or dump valve 12 is connected in the pipe 11 and opening and closing of this valve will control the escape or dumping of liquid from within the vessel 10. The valve may be of any suitable construction and, as illustrated in Figure 9, includes a valve body 13 having a valve seat 14 therein with a valve element 15 movable with respect to the seat. When the valve element 15 is raised flow through the outlet pipe 11 is permitted and seating of the valve will, of course, shut off flow through said line.

The valve element 15 has a stem 16 which has its upper end connected with an operating diaphragm 17 and said diaphragm is normally urged downwardly by a coil spring 18 to urge the valve toward a seated position. The pressure of the spring may be adjusted in the usual manner by an adjusting screw 19. When the pressure in the chamber 17a below the diaphragm 17 reaches a predetermined point as controlled by adjustment of the spring 18 the valve element 15 is opened to allow escape of liquid from the vessel 10 while a reduction of the pressure in the chamber 17a to a predetermined point will permit the spring to close said valve element. This type of valve may be operated with a throttling action by maintaining a predetermined pressure in the chamber 17a which will maintain the valve element 15 in a desired or predetermined position with respect to its seat in which case a controlled constant discharge of liquid from the vessel will occur. A pilot pressure fluid is conducted to the chamber 17a below the diaphragm by a pilot pressure line 20 which has one end connected in the diaphragm case and its opposite end connected to a suitable source of pilot pressure fluid. The particular construction of the liquid outlet or dump valve 12 is subject to some variation and so long as the valve is a motor valve or pressure-actuated, either pressure-opening or pressure-closing, its operation may be controlled by the improved apparatus to be hereinafter described.

For controlling the operation of the outlet or dump valve 12 a torque tube assembly generally designated A (Figure 1) is mounted in the wall of the vessel 10 and this assembly includes a solid float element B which is suspended within the interior of the vessel. The torque tube assembly is adapted to transmit energy or force from the float element to a pilot pressure control unit C which is located exteriorly of the vessel. A pilot pressure supply line 21 extends from a suitable source of pilot pressure into the unit C and operation of the unit C modulates or controls the pilot pressure to be employed in actuating the liquid dump valve 12. If the valve 12 is to be operated with a snap or quick-opening, quick-closing action, a snap control unit D may be combined with the pilot pressure control unit C. A by-pass line 22 conducts the controlled pilot pressure from the upper portion of the unit C to a base member C' and if the snap control unit is employed, this pressure is utilized to actuate said unit D. The pilot pressure line 20 may extend from the unit D to the chamber 17a beneath the diaphragm 17 of the outlet or dump valve 12. If the snap control unit D is not employed and the valve 12 is to operate with a throttling action, then the line 20 is connected to the member C' to conduct the controlled or modulated pilot pressure directly to the diaphragm 17 of the valve 12.

The float element B is a solid piece of material which would ordinarily sink within the liquid being controlled but since the float element is suspended from the torque tube assembly, it is actually supported or suspended from said assembly. As the liquid within the vessel rises and falls with respect to the float element B said element becomes more or less buoyant and this degree of buoyancy of said float element is utilized to transmit energy through the torque tube assembly to the pilot control unit C to control the pilot pressure which either actuates the snap control unit D or which is applied directly to the diaphragm 17 of the outlet or dump valve 12. Thus, as the liquid level within the vessel 10 rises to a predetermined point to lighten the effective weight of the float element B the pilot unit is actuated to control the pilot pressure and effect opening of the outlet or dump valve 12 to discharge liquid from the vessel 10. As the liquid level within the vessel 10 falls due to the discharge of the liquid through the dump valve 12 the decreased buoyancy of the float element B due to the falling liquid will result in operation of the pilot control unit C to control the pilot pressure and effect closing of said dump valve and a shutting off of the discharge of liquid from the vessel. It is, of course, understood that if the snap control D is employed the valve 12 opens and closes in accordance with the liquid level; if the unit D is omitted the valve 12 will operate with a throttling action and the valve element 15 will seek an adjusted position allowing a constant controlled discharge of liquid. In either event, the control unit C controls the operation of the valve 12.

The torque tube assembly A (Figures 4 and 7) includes a torque tube 23 which may be made of considerable diameter and of relatively thick wall thickness, whereby it is sufficiently strong to support the weight of the float element B without bending. In order to impart torsional flexibility to the tube 23 said tube is split or slotted along a longitudinal axis to form an elongate slot 24 which extends parallel to the axis of the tube. One end of the tube is welded at a single radial point 25 to a collar 26 which is formed on the inner end of a supporting flange or plate 27. The supporting flange 27 is insertable within a coupling nipple 28, which is welded at 29 to the wall 10a of the vessel 10, and said nipple has its bore aligned with an access opening 30 formed in the wall of the vessel. The flange 27 has an annular peripheral enlargement 31 which abuts the outer end of the coupling nipple 28 and a coupling nut or union 32 is adapted to overlie the flange 27 and to engage threads 33 on the outer end of the nipple 28 whereby the flange having the torque tube 23 connected therewith may be mounted in the wall of the vessel 10. An O-ring 34 disposed within an annular groove 35 in the flange or plate 27 and seals off between said flange and the nipple 28. With the flange mounted in position within the coupling nipple and with the torque tube 23 extending inwardly into the vessel the weld 25 which connects the tube to the collar 26 is preferably disposed on top of said tube with the longitudinal slot 24 extending along the bottom of said tube and with such disposition of the slot, the bending strength of the tube is not materially reduced; if desired, the slot 24 may be located at any other radial point.

A reduced sleeve section 36 is preferably formed integral with the outer end of the supporting flange or plate 27 and said section and flange have an axial bore 26a which is of substantially the same diameter as the bore 23a of the torque tube 23. The extreme outer portion of the bore 36 of the sleeve section is slightly reduced and internally screw threaded at 36b to receive a flanged bearing holder 37 and the bore 37a of said holder is reduced as compared to the bore 36a of the said sleeve section. An O-ring packing 37b seals off between the holder 37 and the bore of the sleeve section.

A cylindrical drive or operating bar 38 extends axially through the torque tube 23 and through the bore 36a of the sleeve and flange and the major portion of this drive bar has a diameter slightly less than the diameter of the bores 23a and 36a. The inner end of the drive bar is formed with an integral enlargement or head 39 having a diameter substantially equal to the bore of the tube and the enlargement 39 is connected to the tube through a transverse pin 40 which is mounted within the enlargement 39 and which has its ends projecting into diametrically opposed openings 41 formed in the wall of the tube 23. As is clearly shown in Figure 5, the diameter of the connecting pin 40 is less than the size of the openings 41 whereby the connection between the operating or drive bar 38 and the torque tube is somewhat of a loose connection with some play being permitted between the parts.

Beyond the enlargement 39 on the drive bar 38 the bar is formed with a reduced pin 42 and the inner end of a supporting arm 43 is attached thereto. The arm is clamped against the enlargement 39 in a desired position by means of a clamping nut 44 (Figure 7). The arm 43 extends radially with respect to the drive bar and has its outer end pivotally connected by a pin 45 with the upper end of an arm 46 to which the float element B is attached. It will thus be evident that the float element B is suspended by means of the arm 43 from the end of the drive bar 38 and the weight of this float element, because of its suspension by means of the arm, will place the bar under a torsional stress. The bar is connected by the pin 40 and opening 41 to the end of the torque tube 23 which tube is fastened at the single radial point 25 to the main supporting flange 27. The torque tube 23 actually functions to support the drive bar and in order to permit the tube to undergo torsional movement the longitudinal slot 24 is provided in the tube. It is obvious that a relatively large diameter tube is very stiff and rigid in torsion and by providing the elongate slot 24, torsional flexibility is imparted to the tube without substantially weakening the tube so far as bending stresses are concerned. By providing a torque tube constructed in this manner a sufficiently strong tube capable of supporting a relatively heavy float element B is provided, and yet said tube is sufficiently flexible in torsion so that it does not materially interfere with the torsional stresses imposed upon the drive bar, to provide for sensitivity. It might be noted that the stress in the tube 23 under torsion is along an axial plane on the surface and the longitudinal slot 24 permits motion of the tube to occur along an axial line with the result that torsional flexibility in the tube is produced.

The outer end of the drive bar 38 is formed with a reduced shank 47 and beyond the shank the bar is further reduced to provide a cylindrical extension 48 which functions as a small bar. The shank 47 and extension 48 project through the bore 37a of the bearing holder 37 and a seal is formed between the extension and the bore 37a by a suitable elastic packing such as an O-ring or rubber collar 49. To reduce friction between the extension 48 and the supporting element a bearing assembly 51 is mounted within the bearing holder 37 and surrounds the extension 48. It is noted that the extension 48 undergoes only extremely slight rotative movement in operation and the elasticity of the packing 49 is sufficient to allow the slight rotative movement of the extension therein without the necessity of a sliding contact between the surface of the extension 48 and said packing. This means that there is substantially no frictional resistance set up by the packing to the slight rotative movement of the extension.

In the operation of the torque tube assembly the weight B which is a solid mass is suspended from the supporting arm 43 attached to the end of the drive bar 38. The drive bar has its outer reduced extension 48 disposed exteriorly of the vessel with this end being supported within the sleeve section 36 of the main supporting flange or plate 27, while its inner end is supported and connected with the torque tube 23. The weight of the float element B will impose a torsional stress on the drive bar 38 and assuming that it is suspended in atmosphere a predetermined torque will be imparted to said bar, this torsional stress also being transmitted to the torque tube 23 through the pin 40 and openings 41.

When the assembly is mounted within the pressure vessel and the liquid within said vessel rises into contact with the float element B, the effective weight of the float element will be reduced by the weight of the liquid which said element displaces. As the liquid rises higher with respect to the float element B the effective weight of the float element is decreased proportionally to the liquid rise. Similarly as the liquid falls with respect to the float element the effective weight of said element is increased. Actually, there is no appreciable movement of the float element as the liquid rises and falls with respect thereto but due to the buoyancy of the element the effective weight being imposed upon the drive bar and resulting in a predetermined torsional stress on said bar is varied. As the effective weight of the element B changes to vary the torsional stress on the bar the force represented by the torsional stress is varied accordingly. This variable force is, of course, present in the reduced extension 48 of the bar which is disposed exteriorly of the vessel and said force changes without any appreciable rotation of the drive bar because actually, said force is represented by a greater or lesser torsional twisting of the shaft 38.

It thus becomes obvious that as the liquid level within the vessel varies with respect to the float element B the force which is transmitted through the drive bar and to its extension 48 is varied in direct proportion to the changes in liquid level. This variable force which is transmitted to the reduced extension of the drive bar located exteriorly of the vessel is utilized to control the pilot control unit C which in turn controls operation of the dump valve 12. If the snap control unit D is employed, rise of the liquid level to a predetermined point actuates the pilot control unit C and snap control unit D to open the dump valve 12 and permit the escape of liquid from the vessel; upon the liquid falling to a predetermined level the extension 48 of the drive shaft 38 functions to again actuate the pilot control unit C and snap control unit D and thereby close the outlet valve. It is noted that if the valve 12 is actuated with a throttling action the particular torsional stress in the drive bar, as controlled by the liquid level controls the position of the valve 12 and said valve may remain partially open at all times to allow a predetermined constant escape of liquid from the vessel.

For transmitting the variable force which is representative of liquid level within the vessel from the extension 48 of the drive bar 38 said extension has one end of an operating arm 52 fastened thereto by means of a split clamp 53. A U-shaped carrier 53 is slidable to various positions on the free end of the operating arm 52 and a screw 54 is threaded through the extending ends of the carrier 53 (Figure 4). A lock nut 55 threaded on the upper portion of the screw locks said screw in adjusted positions with respect to the carrier and also functions to lock the carrier 53 in adjusted positions longitudinally of the operating arm 52. The lower end of the screw 54 is adapted to rest upon and engage a pivoted lever 56 which is mounted on a pivot pin 57, said pin being disposed below the free end of the operating arm 52. In this manner any force transmitted through the extension 48 is imparted to the arm 52 and causes a downward force to be exerted by the screw 54 upon the lever 56.

It will be evident that by adjusting the carrier 53 and pin 54 with respect to the extension 48 of the drive bar which is the pivot point of the operating arm 52, the distance between the extension and the screw 54, as well as the distance between said screw and the pivot pin 57 of the lever 56 is varied to change the mechanical advantage from the drive bar to the lever. If the mechanical advantage is high, a relatively small change in buoyant force on the float element B will result in considerable downward force being exerted by the lever 56; on the other hand if the mechanical advantage is low, a greater variation in buoyancy is necessary to produce the same applied downward force by said lever and thus by adjusting the carrier 53, it is possible to adapt the control mechanism to either throttling or snap-action operation of the liquid dump valve 12 since this adjustment determines the spread between opening and closing of the dump valve 12. Adjustment of the screw vertically to engage the lever 56 with more or less force determines the working level of the liquid, that is, the level to which the liquid will rise or fall before the valve 12 opens or closes.

The force from the drive bar extension 48 is transmitted through the operating arm 52, screw 54, and lever 56 to a force transmitting or operating member or pin 58 of the pilot control unit C. The member 58 has a conical upper end so as to engage the lever 56 with a point contact. The pilot control unit is illustrated in Figure 8 and comprises a casing or housing 59 having an inlet opening 60 at one side thereof. A pilot supply line 21 is connected into the opening 60 which communicates with a chamber 61 located axially within the lower portion of the housing 59. An axial bore 62 extends upwardly from the chamber 61 and has a valve seat collar 63 provided with an annular valve seat 64 threaded therein. The collar 63 has an axial bore 63a extending therethrough whereby flow from the pilot supply line 21 may enter the chamber 61 and then flow upwardly past the valve seat 64 into a chamber 62a in the upper portion of the bore 62 of the casing. A valve 65 is adapted to engage the seat 64 and has a valve stem 66 having its upper end threaded into a depending shank 67 provided in the lower portion of a tubular element 68. A diaphragm 69 spans the upper end of the bore 62 of the housing and the outer periphery thereof is clamped between the upper end of the casing or housing 59 and a locking ring 70. The diaphragm 69 has a central opening through which the shank 67 of the element 68 extends and a clamping nut 71 clamps the inner portion of the diaphragm to said element 68. A locking screw 72 which is threaded within the lower reduced axial bore of the element 68 engages the upper end of the valve stem 66 and permits an adjustment of the valve stem with respect to the element 68.

The force transmitting or operating member 58 of the pilot control unit is hollowed out and has its lower edge engaging the upper edge of the tubular element 68 which carries the valve 65. The interior of the member 58 and the enlarged upper portion of the bore of the element 68 form a chamber 73 which has communication with the area below the diaphragm 69 through a vertically extending passage 73. The member 58 is flanged and may undergo limited upward movement with respect to the element 68 but is confined against complete upward displacement by a retaining cap 74 which is threaded onto the upper end of the casing 59. The area of chamber 62a below the diaphragm but above the valve seat communicates through an inclined passage 75 with an opening 75a within which one end of the conductor 22 is threaded and said conductor has its lower end threaded into an opening 76 formed in a base member 77. The opening 76 communicates with a chamber 78 formed axially within the base 77 and said chamber is also in communication with an opening 79 which may be connected with the line 20 leading to the dump valve 12 if a throttling action is desired; if the snap control unit D is employed to actuate the valve 12 with a snap action, the opening 79 will be plugged, as will be explained.

In the operation of the pilot control unit C and assuming the valve 65 to be in a closed position a pilot fluid under a predetermined constant pressure is present in the line 21 and in the chamber 61 and is acting against the under side of the valve 65 to assist in holding said valve seated. When a predetermined force occasioned by torsional twist in the drive shaft 38 is imparted to the operating arm 52 and is then transmitted through the screw 54 and lever 56 to the operating member 58 of the pilot unit, this force acts through the member 58 and element 68 to urge these parts downwardly and thereby move the valve 65 downwardly. As soon as the valve 65 is unseated pilot pressure is admitted into the chamber 62a below the diaphragm 69 and this pressure immediately acts upon the diaphragm to tend to move said diaphragm upwardly which is, of course, in opposition to the downwardly acting force on the operating member 58. Immediately that the admitted pressure in chamber 62a balances the force being applied to the member 58 the valve 65 is re-seated but at this time a predetermined pressure has been built up in the chamber 62a and also in the chamber 78 in the base member 77. Continued application of force to the operating member 58 through the drive shaft 38 and its associated mechanism will result in the valve 65 again opening but immediately upon opening sufficient pressure acts against the under side of the diaphragm 69 to immediately balance the applied force but this results in a further increase in pilot pressure chambers 62a and 78. It thus becomes apparent that with the particular pilot control unit the application of a force to the operating member 58 to unseat the valve 65 immediately admits pressure which balances the applied force to reseat the valve and thus a gradual building up of pressure within the chambers 62a and 78 occurs. This increase is directly proportional to the force applied to the operating member 58 and as explained, the applied force is actually representative of liquid level in the vessel 10. The controlled or modulated pilot pressure within the chambers 62a and 78 is also present in the chamber 73 formed between the valve supporting element 68 and the operating member 58 but at this time the applied force acting downwardly on the member is sufficient to hold these parts in engagement with each other.

The continued application of force to the operating member 58 of the control unit C finally results in building up the pressure in the chambers 62a and 78 to the predetermined point necessary to effect operation of said valve to either open said valve 12 or if the valve is already open to open it further and thereby allow a discharge of liquid from the vessel 10. Fall of the liquid level within the vessel results in a decrease in the force applied to the member 58, and decrease of this applied force to a point which permits the pressure present within the chamber 73 formed between the operating member 58 and the valve supporting element 68 to overcome said force causes separation of the member 58 from the element 68, whereby pressure from the chambers 62a and 78 is vented to atmosphere through the axial opening 74a in the retaining cap 74. Escape of pressure from the chambers 62a and 78 reduces the pressure on the main outlet valve to allow said valve to close or move toward a closed position. The variation in pilot pressure in the chambers 62a and 78 is directly proportional to the applied force and the force applied is controlled by the liquid level in the vessel; therefore, variations in the modulated or controlled pilot pressure are in accordance with changes in the liquid level.

If the liquid dump valve 12 is to be operated with a throttling action the line 20 is connected in the opening 79 in the base so that the pressure in the chamber 78 is conducted directly to the diaphragm chamber 17a (Figure 9) of the valve 12. This pressure is modulated or controlled directly in accordance with the applied force which is representative of the liquid level and with such a direct connection between the chamber 62a and the motor valve 12, said motor valve will be throttled or automatically adjusted to permit a constant controlled discharge of liquid from the vessel 10 to maintain a desired level within the vessel.

It is pointed out that because the pilot unit C functions to immediately balance the force which is applied to the member 58, substantially zero motion is necessary in the drive bar 38, the operating arm 52 and lever 56 because as soon as movement of these parts begins the valve 65 within the unit C opens and is then immediately closed by the balancing pressure. This slight motion is an important feature of the invention since it permits efficient packing off around the drive bar extension 48 due to the fact that there is substantially no rotative movement of the extension within the packing 49. Actually, the slight rotative movement of the extension is a rocking or oscillating motion of the extension within the packing with the elasticity of the packing permitting such motion while the packing remains in tight frictional engagement with the extension. Thus there is no sliding contact between the surface of the extension and the packing and frictional resistance to the motion of the extension is minimized, which makes the apparatus operable under exceptionally high pressures without danger of leakage.

As pointed out the line 20 (Figure 8) is connected to opening 79 leading from the chamber 78 when a throttling action is desired. It is many times desirable that the valve 12 be actuated with a snap action, that is, quick-opening and quick-closing, and in such event the snap control unit D is employed. In Figure 8 this unit is illustrated as combined and incorporated with the pilot control unit C while in Figure 11 it is illustrated as a separate unitary device. Referring to Figure 8, the snap control unit D comprises a generally cylindrical housing 80 which is mounted between the casing 59 of the unit C and the base 77. The housing has an axial bore 80a which is enlarged at its lower end to form a chamber 80b. A valve assembly is mounted within the housing and includes an upper valve disc 81 having an annular valve seating ring 82 and a lower valve disc 84 having an annular valve seating ring 85, the discs being connected by a shank 83 which extends through the bore 80a. The upper valve 82 is disposed within the chamber 61 in the lower portion of the unit C and has its valve ring 82 adapted to engage a flexible seat 86 provided on the upper end of the housing. The lower valve has its valve ring 85 adapted to engage a flexible valve seat 87 provided at the intersection of the bore 80a and the chamber 80b.

The diameter or area of the valve 82 at its seating position is of a greater cross-sectional area than the diameter of the valve 85 at its point of seating and the length of the connecting shank 83 is such that when one of the valves is seated, the other is unseated. The lower end of the chamber 80b is closed by a flexible diaphragm 88 which spans the lower end of the housing 80 and which has its peripheral edge portion clamped between the housing and the base 77. The lower valve disc 84 is adapted to be engaged by the upper surface of the diaphragm 88 and the effective cross-sectional area of said diaphragm is greater than the effective seating area of the upper valve 82. The diaphragm actually functions as the top of the chamber 78 in the base 77 and is therefore exposed to the pressure within said chamber. A restricted port or vent 89 to atmosphere is formed radially within the housing 80 and communicates with the chamber 80b below the lower valve seat 87. A threaded outlet opening 90 extends radially through the housing and is located between the upper and lower valve seats 86 and 87 and has one end of the line 20 connected therein; the other end of said line is connected to the diaphragm chamber 17a of the outlet or dump valve 12.

When the snap control unit D is employed a plug 20b shown in dotted lines in Figure 8 is threaded into the opening 79 which extends from the chamber 78 in the base 77 and the line 20 connects the opening 90 of the snap control unit with the diaphragm chamber 17a of the outlet or dump valve. In the operation of the snap control unit the constant supply pilot pressure from the line 21 is present within the chamber 61 and is acting on the effective cross-sectional area of the upper valve 82 to hold this valve downwardly in a seated position. As the applied force on the pilot control unit operating member 58 is increased to increase or build up the pressure within the chamber 62a and also within the chamber 78 within the base 77, this increased pressure acts against the diaphragm 88 and tends to urge the valve discs 84 and 81 upwardly. The relationship between the area of the diaphragm 88 to the area of the valve 82 will control the point at which the modulated or controlled pilot pressure in chamber 78 will move the valve 82 upwardly off of its seat. When this point is reached and the pressure in chamber 78 is sufficient to move the valve 82 upwardly, the valve 82 is unseated to admit the full pilot pressure to the bore 80a of the housing 80 and to the line 20 which leads to the liquid outlet valve diaphragm 17. At the instant that the pressure in the chamber 78 acting against the diaphragm 88 overcomes the constant supply pressure acting to hold valve 82 seated, both the lower valve 85 and upper valve 82 are snapped upwardly and the action is so rapid due to the sudden release of force holding the valve assembly down that the lower valve 85 moves into engagement with its seat 87 before the pilot pressure can fill the volume of the bore 80a between the upper and lower valves 82 and 85. As noted the area of the valve 85 is less than the area of the valve 82 and thus, the pilot supply pressure which is tending to move the valve downwardly off of its seat is acting on the lesser area of the valve 85. Because the effective area of the diaphragm 88 is considerably larger than the area of the lower valve 85, the valve 85 will be held seated against the full pilot pressure and said pilot pressure is conducted to the diaphragm of the liquid outlet or dump valve 12 to open the same with a snap or quick opening action.

Opening of the valve 12 allows the discharge of liquid from the pressure vessel 10 and results in a reduction of applied force to the pilot operating member 58 and as this force reduces sufficiently to allow the pressure in the chamber 73 formed between the operating member 58 and element 68 to overcome this applied force the pin 58 is separated from the valve carrying element 68 to allow a venting of pressure from chamber 78 to atmosphere to effect a reduction in pressure in said chamber 78.

Obviously, the pressure will continue to reduce in the chamber 78 until the full pilot pressure acting on the lower valve 85 is sufficient to unseat this valve and move the assembly downwardly. As the valve 85 begins to leave its seat there is a momentary leakage of pilot gas under this seat outwardly through the vent opening 89 and since the diameter of this opening is relatively small a back pressure is built up within the chamber 80b above the diaphragm 88. This back pressure immediately acts on the top side of the diaphragm 88 and causes said diaphragm to move downwardly to remove all resistance to lowering of the valve disc assembly and the pilot pressure in chamber 61 again seats the upper valve 82. The pressure which was acting upon the dump valve 12 through the line 20 then bleeds outwardly to atmosphere through the exhaust or vent opening 89 and the valve 12 moves to a closed position. The parts remain in this position until the applied force again builds up the modulated or controlled pressure within the chamber 78 at which time the operation is repeated.

The arrangement which combines the units C and D, as illustrated in Figure 8, is adaptable for use in controlling the liquid outlet or dump valve 12 either with a throttling action or with a snap or quick-opening and quick-closing action. As has been noted, if a snap action is desired the opening 79 in the base 77 is plugged by the plug 20b and flow to the outlet or dump valve is through the line 20. If a throttling action is desired the plug 20b closes the port 90 and the line 20 connects with the outlet valve.

In the event that the outlet or dump valve is to be actuated solely with a throttling action the pilot control unit C may be constructed as a separate unit which is illustrated in Figure 10. The construction would be the same as shown in Figure 8 except that the chamber 61a in the lower portion of the casing 59 will be omitted and a completely closed chamber 61' substituted therefor. In this event the line 22 of Figure 8 is eliminated as is the base 77 and the conductor 20 leading to the outlet or dump valve 12 is connected directly into the opening 75a extending from the inclined passage 75 which communicates with the chamber 62a below the pilot operating diaphragm 69.

The snap control unit D may also be constructed as a separate unit and in Figure 11 such an arrangement is illustrated. In this instance, the snap control unit D includes a casing 80' having a chamber 63' at its upper end and a chamber 78' at its lower end, these chambers being closed by closure plates 91 and 92, respectively. A line 22' extends from a pilot control unit to control the pressure in the lower chamber 78' while the conductors 20 and 21 are connected to the casing 80' in the same manner as hereinbefore described. It is evident that the operation of this unit will be identical to the operation as described with respect to the unit shown in Figure 8.

The apparatus provides a very sensitive and accurate control for controlling the liquid level in a pressure vessel. The improved torque tube assembly A comprises a minimum number of parts which are of minimum weight and may be readily connected with any pressure vessel either of the horizontal or vertical type. The provision of the pilot control unit C makes it possible to control or modulate the pilot pressure without any substantial movement of the drive rod 38 since actually the rod 38 is merely a force transmitting element. This assures efficient packing off under exceptionally high pressures around the rod which is the only member extending through the wall of the pressure vessel since said rod does not have a sliding rotative contact with the packing 49 and frictional resistance is thereby minimized. The particular mechanism which transmits the applied force from the drive rod to the control unit C permits an adjustment whereby the level to which the liquid will rise within the vessel, and the operating range between opening and closing of the dump valve 12, may be accurately controlled.

In the operation of the apparatus the float element or weight B is suspended within the vessel on the end of the drive rod 38 which is connected to the end of the torque tube 23. The torque tube is anchored or fixed by the weld 25 to the supporting flange and thus, the weight of the float element sets up or creates a predetermined twist or torque in the drive rod. This torque, under atmospheric conditions, will apply a predetermined force to the pilot operating member 58 of the pilot control unit C. The float element or weight is illustrated as suspended from that side of the rod 38 which will cause the rod to apply force in a clock-wise direction in Figure 6 as the liquid level rises around the float element. As said liquid level rises around the float element the effective weight of the float element is reduced by the weight of the displaced liquid and this reduction in the effective weight of the float will result in a decrease in the torque or twist in the drive rod extension 48 which will tend to move the operating arms 52 downwardly. Actually, there is no appreciable movement in the arm but rather the reduction in torsional twist in the drive rod extension 48 will produce a downward force on the screw 54 which is transmitted through the pivoted lever 56 to the force-transmitting or operating member 58 of the control unit C.

Continued rise in liquid level within the vessel around the float element B results in further reduction in effective weight of said element and a resultant increase in applied force to the operating member 58 of the pilot control unit C whereby the controlled or modulated pressure in chamber 62a builds up to a predetermined point. When the pressure within the chamber 62a and the chamber 73 in communication therewith is increased to a point which will either operate the snap control unit D or will further open the outlet valve 12 if no snap control is employed, the liquid discharge from the vessel is commenced or increased. Operation of the liquid dump valve 12 results in a fall of the liquid level around the float element B and this increases the effective weight of said float element with the result that an increased torsional twist is imparted to the drive rod 38. Increased torsional twist in the rod lessens the force which is applied through the operating arm 52 and lever 56 to the operating member 58 of the pilot control unit C and when this force decreases to a predetermined point as controlled by the adjustment of the screw 54 and the adjustment of the carriage 53 the pressure within the chamber 73 of the pilot unit separates the member 58 from the valve carrying element 68 and allows escape of the pressure from the chamber 73. It is noted that the element 68 and its co-action with the operating member 58 of the pilot control unit form a relief valve which permits venting of pressure to atmosphere. Thus, upon decrease in the force being applied to the operating member 58 to a predetermined point, the snap control unit D shuts off pressure to the outlet valve 12 or if the snapper is not employed reduction in the pressure throttles the outlet valve to an adjusted position.

Any rise or fall of the liquid level in the vessel will immediately vary the effective weight of the float element and this increase or decrease in effective weight of the float element B is instantaneously converted into a torsional twist in the drive rod 38 which is instantaneously transmitted to the pilot control unit C as an applied force. As has been noted the pilot control unit includes means for immediately balancing the applied force with the result that substantially zero motion of the shaft 38, operating arm 52, lever 56 and operating pin 58 is had. The apparatus is extremely sensitive to very small changes in liquid level because the slightest change in liquid level will vary the applied force on the control unit. Accurate adjustment of the controlled or modulated pressure in accordance with liquid level changes may be accomplished by means of the force transmitting mechanism which consists of the operating arm 52 and lever 56, together with its associated carriage 53 and adjusting screw 54.

It will be evident that the particular pilot control unit is so arranged that the constant pilot supply pressure is present in the conductor 21 and this pressure is permitted to enter the chamber 62a in accordance with the applied force. As the applied force increases the pressure in chamber 62 increases and it is this controlled or modulated pressure which is utilized to operate the dump valve 12 either by a throttling action directly through line 26 or by a snap action through the snap control unit D. The snap control unit is arranged so that when the modulated or controlled pilot pressure reaches a predetermined pressure which is representative of liquid level the snap control unit operates to place the full pilot pressure from conductor 21 on the operating diaphragm of the dump valve 12; similarly, when a pressure drop in the modulated or controlled pressure occurs to a predetermined point the snap control unit D functions to immediately shut off communication between the pilot supply conductor 21 and the operating diaphragm of the valve 12 and at the same time to permit bleeding of the line 20 which extends from said dump valve. The pilot pressure system is such that a constant bleed of the pilot pressure is not required but rather a closed system is employed. The only time that pilot pressure is discharged to atmosphere is when it is desirable to reduce the pressure to either throttle the valve 12 toward a closed position or to fully close said valve when the snap control unit D is employed. There are no small orifices or nozzles which might cause freezing due to pressure drop thereacross or which might become clogged and this is one of the features of the invention since it eliminates difficulty which is occasioned with the present type of constant bleed type pilot controls.

The torque tube assembly A is exceptionally rugged in construction with the tube 23 being of considerable size and of sufficient strength to support a relatively heavy float element B. The longitudinal slot 24 which is formed in the torque tube is preferably located at the lower end of said tube so as to provide maximum resistance to bending of the tube while forming a minimum resistance to torsional twist of said tube. With this arrangement the energy which is transmitted to the drive rod 38 by the weight is utilized to its fullest extent by converting substantially all of said energy into applied force at the pilot control unit. There is a minimum energy loss due to frictional resistance in the system between the suspended arm 43 which carries the weight and the point of application of force to the operating member 58 of the pilot unit C. Such minimum energy loss provides for extreme sensitivity in the control whereby liquid levels may be accurately controlled to a desired degree. Although the supporting arm 43 is illustrated as substantially straight, said arm may be curved to facilitate insertion of the torque tube assembly and the attached weight into the access opening 30 in the wall of the vessel. It is also pointed out that the liquid outlet dump valve 12 has been illustrated as a pressure-opening valve but said valve may be pressure-closing, in which event the decrease in modulated or controlled pilot pressure would effect opening of said valve.

From the foregoing it will be seen that this invention is one well adapted to attain all of the ends and objects hereinabove set forth together with other advantages which are obvious and which are inherent to the structure.

It will be understood that certain features and subcombinations are of utility and may be employed without reference to other features and subcombinations. This is contemplated by and is within the scope of the claims.

As many possible embodiments may be made of the invention without departing from the scope thereof it is to be understood that all matter herein set forth or shown in the accompanying drawings is to be interpreted as illustrative and not in a limiting sense.

Having described the invention, I claim:

1. A control assembly responsive to variations in liquid level within a vessel including, a self-supporting torque tube having one end secured to the inner wall of a pressure vessel and projecting inwardly into the interior of said vessel, said tube having a longitudinal slot extending from end to end thereof, which slot functions to weaken the tube in torsion, a drive bar extending axially through the torque tube and connected to said tube at the free end of the tube, said bar also projecting through the wall of the vessel to the exterior thereof, means for sealing off around the drive bar to prevent escape of pressure from the interior of the vessel, and a float element suspended from the inner end of the drive bar.

2. A control assembly responsive to variations in liquid level within a vessel including, a support having an axial bore therethrough adapted to be removably mounted and sealed within an access opening in the wall of a pressure vessel, a self-supporting torque tube having one end secured to the inner surface of the support and projecting into the interior of the vessel, said tube having a longitudinal slot extending from end to end thereof, which slot functions to weaken the tube in torsion, a drive bar extending axially through the support and torque tube with its outer end located exteriorly of the vessel and its inner end within the vessel beyond the torque tube, means for connecting the inner end portion of the bar to said tube, sealing means surrounding the bar and engaging the bore of the support for sealing off around said bar, a radially extending supporting arm attached to the extreme inner end of the bar, a float element secured to the arm, and a force-transmitting member mounted on the extreme outer end of the drive bar.

3. A control assembly responsive to variation in liquid level within a vessel including, a support removably mounted and sealed within an access opening in the wall of a pressure vessel, a relatively elongate generally tubular member having one end secured to the inner surface of the support and projecting inwardly into the interior of said vessel, said member having a longitudinal slot extending from end to end thereof with the longitudinal edges which define said slot being spaced from each other, said slot imparting a low resistance to torsional deflection of the member without weakening its resistance to bending, a drive bar extending longitudinally of the elongate member and connected to the member at a point spaced from the point of attachment of the member to the support, said drive bar projecting outwardly through the support with its outer end located exteriorly of the vessel, sealing means between the bar and the support for sealing off around said bar, and a fluid displacement member suspended from the inner end of the drive bar.

4. A control assembly responsive to variations in liquid level within a vessel including, a supporting member having one end secured to the inner wall of a pressure vessel and projecting inwardly into the interior of said vessel, said member having high resistance to bending and having a structural shape which provides a pair of longitudinal edges on the member which are unconnected and spaced from each other whereby said edges may move longitudinally with relation to each other without overlapping upon the application of torsional stress to the member to thereby impart torsional flexibility to said member, a drive element extending longitudinally of the member and having its outer end projecting through the wall of the vessel to the exterior thereof, means for sealing off between the drive element and the wall of the vessel, connecting means between the drive element and the supporting member connecting said element to said member at a point spaced from the point of attachment of the supporting member ot the wall of the vessel, said connecting means permitting limited longitudinal movement of the member with respect to the drive element while maintaining a rotatable connection between said member and element, and a fluid displacement member suspended from the inner end of the drive bar.

5. A control assembly responsive to liquid level within a vessel including, a support removably mounted and sealed within an access opening in the wall of a pressure vessel, a member which is relatively elongate with respect to its width, said member having one end adjacent to the inner surface of the support and its opposite end projecting inwardly into the interior of said vessel, the edge portion of that end of the member which is adjacent the support being secured to the support at only a single point along said edge whereby the remainder of said edge is free from connection with the support, said member having high resistance to bending and having a structural shape which provides a pair of longitudinal edges on the member which are unconnected and spaced from each other, whereby said edges may move longitudinally with relation to each other without overlapping upon the application of torsional stress to the member to thereby impart torsional flexibility to said member, a drive bar extending longitudinally of the member and connected to the member at a point spaced longitudinally from the point of attachment of the member to the support, said drive bar projecting outwardly through the support with its outer end located exteriorly of the vessel, sealing means between the bar and the support for sealing off around said bar, and a fluid displacement member suspended from the inner end of the drive bar.

6. A control assembly responsive to variations in liquid level within a vessel including, a support adapted to be removably mounted within an access opening within the wall of a pressure vessel, sealing means for sealing between said support and the vessel, a torque tube having one end secured to one end of the support and projecting into the interior of the vessel, said tube having a longitudinal slot extending from end to end thereof, said slot having a width which spaces the longitudinal edges defining said slot from each other, whereby said edges may undergo movement relative to each other in a longitudinal direction without overlapping when a torsional stress is applied to the tube, said support having an axial bore which is aligned with the bore of the torque tube when the tube is secured thereto, a drive bar extending axially through the bore of the support and the bore of the tube with its outer end located exteriorly of the vessel and its inner end within the vessel beyond the torque tube, means for sealing off between the drive bar and the support, means for connecting the drive bar to the tube at a point spaced from the point of attachment of the tube to the support, a float element suspended from the inner end of the drive bar, and a force-transmitting member mounted on the outer end of the drive bar exteriorly of the vessel.

7. A control assembly as set forth in claim 6, wherein the connection between the drive bar and the torque tube is relatively loose to permit limited longitudinal movement of the torque tube with respect to the drive bar while maintaining a rotatable connection between the member and bar.

8. A control assembly as set forth in claim 5, wherein the removable mounting of the support includes a housing surrounding the access opening in the vessel wall for receiving the support and also wherein the support is retained within the housing by a retaining collar having threaded connection with the housing, loosening of said collar without detachment thereof from the housing maintaining the seal between the support and vessel while permitting rotational movement of the support with respect to the housing to effect an adjustment of the position of the fluid displacement member within the vessel.

9. The combination with a pilot pressure control unit having an actuator for operating the control unit by the application of a variable force and having a means therein for balancing the applied force, of a control assembly responsive to variations in the liquid level within a vessel which assembly comprises, a drive bar extending through the wall of the vessel, a supporting member for the drive bar having high resistance to bending and having a structural shape which provides a pair of longitudinal edges on the member which are unconnected and spaced from each other, whereby said edges may move longitudinally with relation to each other without overlapping upon the application of torsional stress to the member to thereby impart torsional flexibility to said member, the member having one end attached to the inner wall of the vessel with its opposite end projecting into the interior of said vessel, means for connecting the drive bar to the supporting member at a point spaced from the point of attachment of the member to the vessel wall, a float element suspended from the inner end of the drive bar and functioning to impart torque to the bar in accordance with changes in liquid level within the vessel, and means mounted on the outer end of the drive bar exteriorly of the vessel and having a direct engagement with the actuator of the pilot pressure control unit whereby said unit is actuated in direct proportion to the variations in torque in the drive bar as controlled by variations in liquid level within the vessel.

10. The combination as set forth in claim 9 wherein the supporting member is a torque tube having a longitudinal slot extending from end to end thereof to impart torsional flexibility thereto.

11. The combination as set forth in claim 9, together with means for adjusting the force applying means which is carried by the outer end of the drive bar and which engages the actuator of the pilot control unit, whereby the operation of the control unit may be varied.

ASBURY SLOAN PARKS.

References Cited in the file of this patent

UNITED STATES PATENTS

| Number | Name | Date |
| --- | --- | --- |
| 1,992,212 | Horne | Feb. 26, 1935 |
| 2,123,652 | Klein | July 12, 1938 |
| 2,248,322 | Annin | July 8, 1941 |
| 2,263,771 | Griffey | Nov. 25, 1941 |
| 2,269,846 | Engel | Jan. 13, 1942 |
| 2,416,570 | Coleman | Feb. 25, 1947 |
| 2,459,527 | Herbert | Jan. 18, 1949 |
| 2,476,030 | Evering | July 12, 1949 |

FOREIGN PATENTS

| Number | Country | Date |
| --- | --- | --- |
| 806,889 | France | Oct. 5, 1936 |
| 872,258 | France | 1942 |